US010710212B2

(12) United States Patent
Karlen et al.

(10) Patent No.: US 10,710,212 B2
(45) Date of Patent: Jul. 14, 2020

(54) METHODS, SYSTEMS, AND APPARATUSES FOR IMPROVING SURFACE FINISH OF ADDITIVELY MANUFACTURED PARTS

(71) Applicant: Delavan Inc., West Des Moines, IA (US)

(72) Inventors: Eric Karlen, Rockford, IL (US); William Louis Wentland, Rockford, IL (US); Sergey Mironets, Charlotte, NC (US)

(73) Assignee: Delavan Inc., West Des Moines, IA (US)

( * ) Notice: Subject to any disclaimer, the term of this patent is extended or adjusted under 35 U.S.C. 154(b) by 152 days.

(21) Appl. No.: 15/798,158

(22) Filed: Oct. 30, 2017

(65) Prior Publication Data

US 2019/0126435 A1 May 2, 2019

(51) Int. Cl.
*B24C 1/00* (2006.01)
*B24C 1/08* (2006.01)
*B24C 3/18* (2006.01)
*B24C 5/06* (2006.01)
*B33Y 80/00* (2015.01)
*B24B 31/00* (2006.01)

(52) U.S. Cl.
CPC .............. *B24C 1/08* (2013.01); *B24B 31/003* (2013.01); *B24B 31/006* (2013.01); *B24C 3/18* (2013.01); *B24C 5/062* (2013.01); *B33Y 80/00* (2014.12)

(58) Field of Classification Search
USPC .......................... 451/32, 34, 36, 38, 326, 327
See application file for complete search history.

(56) References Cited

U.S. PATENT DOCUMENTS

| | | | | |
|---|---|---|---|---|
| 6,758,729 B2 * | 7/2004 | Fujishiro | ............... | B24B 31/033 451/104 |
| 6,875,081 B2 * | 4/2005 | Hoffman | .............. | B23D 61/021 451/32 |
| 7,201,638 B2 * | 4/2007 | Manning | ................. | B24B 31/02 451/327 |
| 2016/0200050 A1 | 7/2016 | Volk et al. | | |
| 2016/0339558 A1 * | 11/2016 | Twelves, Jr. | .......... | B24B 31/006 |

FOREIGN PATENT DOCUMENTS

| | | |
|---|---|---|
| DE | 102010007704 A1 | 8/2011 |
| JP | S57211469 A | 12/1982 |
| JP | S62107963 A | 5/1987 |
| WO | 2017170731 A1 | 10/2017 |
| WO | WO2017/170730 * | 10/2017 ............... C23F 1/08 |

OTHER PUBLICATIONS

Extended European Search Report, Application No. 18202330.9, dated Apr. 12, 2019.

* cited by examiner

*Primary Examiner* — Joseph J Hail
*Assistant Examiner* — Shantese L McDonald
(74) *Attorney, Agent, or Firm* — Locke Lord LLP; Daniel J. Fiorello; Scott D. Wofsy

(57) ABSTRACT

A method of altering an additively manufactured part can include orienting a surface of the additively manufactured part toward a rotational center that may be independent of a rotational axis defined by the additively manufactured part, flowing an abrasive media past the surface, rotating the additively manufacturing part about the rotational center; urging abrasive particles in the abrasive media past the surface abrasive media to impinge the surface with centrifugal force generated by the rotating, and improving surface finish of the surface.

11 Claims, 4 Drawing Sheets

METHODS, SYSTEMS, AND APPARATUSES FOR IMPROVING SURFACE FINISH OF ADDITIVELY MANUFACTURED PARTS

BACKGROUND

1. Field

The present disclosure relates to additive manufacturing, more specifically to post processing for surface finish.

2. Description of Related Art

Additive manufacturing (AM) processes and technologies have matured over recent years. However, the surface roughness of as-built additively manufactured components is a consistent limitation of AM components. Surface roughness has a significant impact on fatigue resistance and product performance.

Surface finish improvement techniques have been investigated to improve the Ra value of additively manufactured components. Existing mechanical techniques such as extrude hone do not adequately and uniformly "polish" internal surfaces of components. Such techniques result in geometric distortion of the part, e.g., at the opening of the part because of the excess machining by the clay like honing material as it is pushed through the channels of the part.

Such conventional methods and systems have generally been considered satisfactory for their intended purpose. However, there is still a need in the art for improved surface finish for AM parts. The present disclosure provides one or more solutions for this need.

SUMMARY

In accordance with at least one aspect of this disclosure, an embodiment of a method of altering an additively manufactured part can include orienting a surface of the additively manufactured part toward a rotational center that may be independent of a rotational axis defined by the additively manufactured part, flowing an abrasive media past the surface, rotating the additively manufacturing part about the rotational center; urging abrasive particles in the abrasive media past the surface abrasive media to impinge the surface with centrifugal force generated by the rotating, and improving surface finish of the surface.

In accordance with at least one aspect of this disclosure, an embodiment of a method of altering an additively manufactured part can include causing an abrasive media to flow across a surface of the additively manufactured part with centrifugal force; and improving surface finish of the surface. The method can further include rotating the AM part about an axis that the AM part is configured to rotate during operation of the AM part.

The method can include rotating an additively manufactured (AM) part to induce abrasive fluid media to flow through the AM part to smooth a surface of the AM part.

In certain embodiments, the AM part can include a rotational component configured to rotate in use. For example, the AM part can be configured to generate flow in use (e.g., a centrifugal compressor) through rotating around a central axis of the part.

Rotating can include rotating the AM part about the central axis of the AM part. Fluidly communicating the at least one internal channel of the AM part can include connecting the internal channel of the AM part to a conduit connected to the abrasive fluid media source. The method can include sealing the conduit to the AM part with a rotational seal configured to provide sealing with relative rotation between the AM part and the conduit.

In certain embodiments, fluidly communicating the at least one internal channel can include disposing the AM part in a bath of the abrasive media. Any other suitable fluid communication with an abrasive media source is contemplated herein.

In certain embodiments, fluidly communicating the at least one internal channel includes disposing the AM part on a manifold such that the at least one internal channel is in fluid communication with the abrasive media source. Rotating can include rotating the manifold about an axis thereof to rotate the AM part around an axis of the manifold. In certain embodiments, rotating can also include rotating the AM part about the central axis of the AM part on the manifold. In certain embodiments, a viscosity of the abrasive media can be about 100 centiPoise (cP) or below at room temperature. Any suitable viscosity and/or type of media is contemplated herein.

In accordance with at least one aspect of this disclosure, an embodiment of a method for improving the surface finish of an additively manufactured article can include fluidly communicating at least one internal channel of an additively manufactured part to an abrasive fluid media source.

The method can include rotating an additively manufactured (AM) part to induce abrasive fluid media to flow through the AM part to smooth a surface of the AM part.

In certain embodiments, the AM part can include a rotational component configured to rotate in use. For example, the AM part can be configured to generate flow in use (e.g., a centrifugal compressor) through rotating around a central axis of the part.

Rotating can include rotating the AM part about the central axis of the AM part. Fluidly communicating the at least one internal channel of the AM part can include connecting the internal channel of the AM part to a conduit connected to the abrasive fluid media source. The method can include sealing the conduit to the AM part with a rotational seal configured to provide sealing with relative rotation between the AM part and the conduit.

In certain embodiments, fluidly communicating the at least one internal channel can include disposing the AM part in a bath of the abrasive media. Any other suitable fluid communication with an abrasive media source is contemplated herein.

In certain embodiments, fluidly communicating the at least one internal channel includes disposing the AM part on a manifold such that the at least one internal channel is in fluid communication with the abrasive media source. Rotating can include rotating the manifold about an axis thereof to rotate the AM part around an axis of the manifold. In certain embodiments, rotating can also include rotating the AM part about the central axis of the AM part on the manifold. In certain embodiments, a viscosity of the abrasive media can be about 100 centiPoise (cP) or below at room temperature. Any suitable viscosity and/or type of media is contemplated herein.

In accordance with at least one aspect of this disclosure, an assembly for improving surface finish of an additively manufactured (AM) part can include a rotatable element configured to rotate at least one AM part while supplying an abrasive media that is caused to move relative to a surface of the at least one AM part due to centrifugal forces acting on the abrasive media while near the surface.

In accordance with at least one aspect of this disclosure, an assembly for improving surface finish of an additively manufactured (AM) part can include a rotatable element configured to rotate an AM part and an abrasive media source configured to be in fluid communication with the AM part when disposed on the rotatable element to allow abrasive media to be pulled through at least one internal channel of the AM part with rotation of the AM part on the rotatable element.

The rotatable element can be a spindle for rotating a rotating component about a central axis thereof. In certain embodiments, a conduit can be configured to interface with the AM part, wherein the conduit includes a rotational seal thereon configured to provide sealing with relative rotation between the AM part and the conduit.

In certain embodiments, the rotatable element can be a manifold configured to receive the AM part such that the AM part is in fluid communication with the abrasive media source. In certain embodiments, the manifold can be hollow and configured to allow the abrasive media to be pulled through the manifold due to rotation of the manifold and the AM parts thereon.

These and other features of the systems and methods of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION

Figure 1:
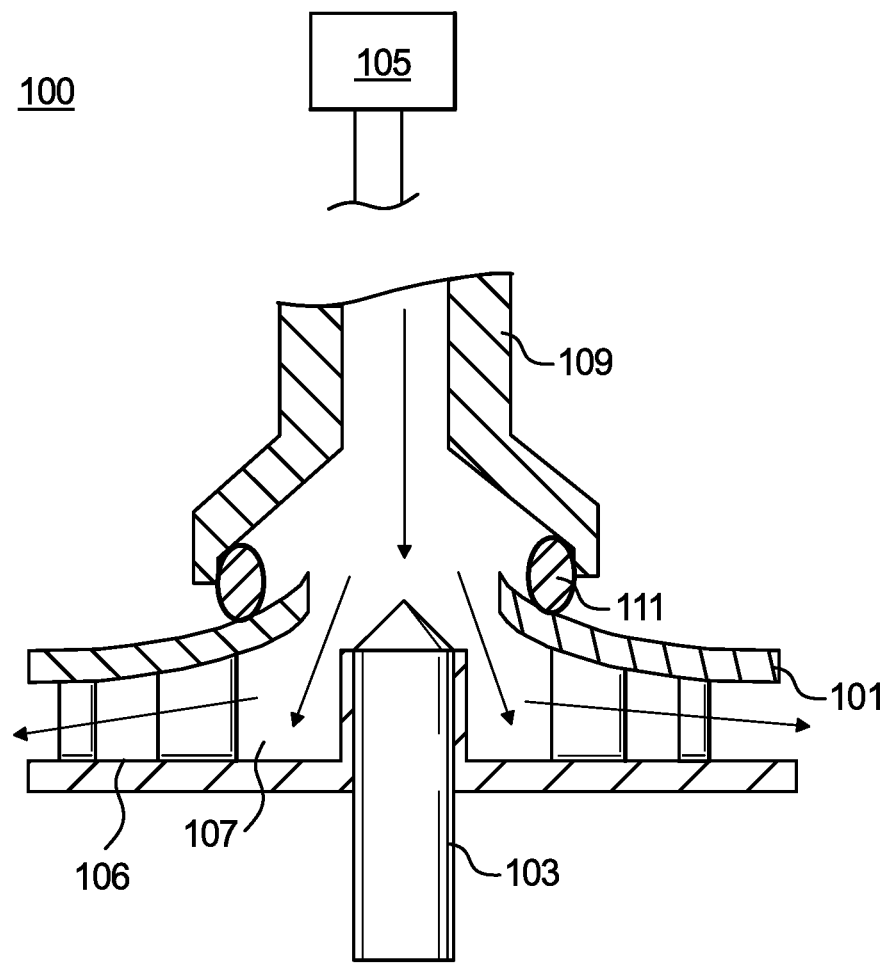
FIG. 1 is a schematic cross-sectional view of an embodiment of an assembly in accordance with this disclosure, showing an additively manufactured (AM) rotational part disposed thereon and abrasive fluid being pulled through due to rotation of the rotational part.
Figure 2:
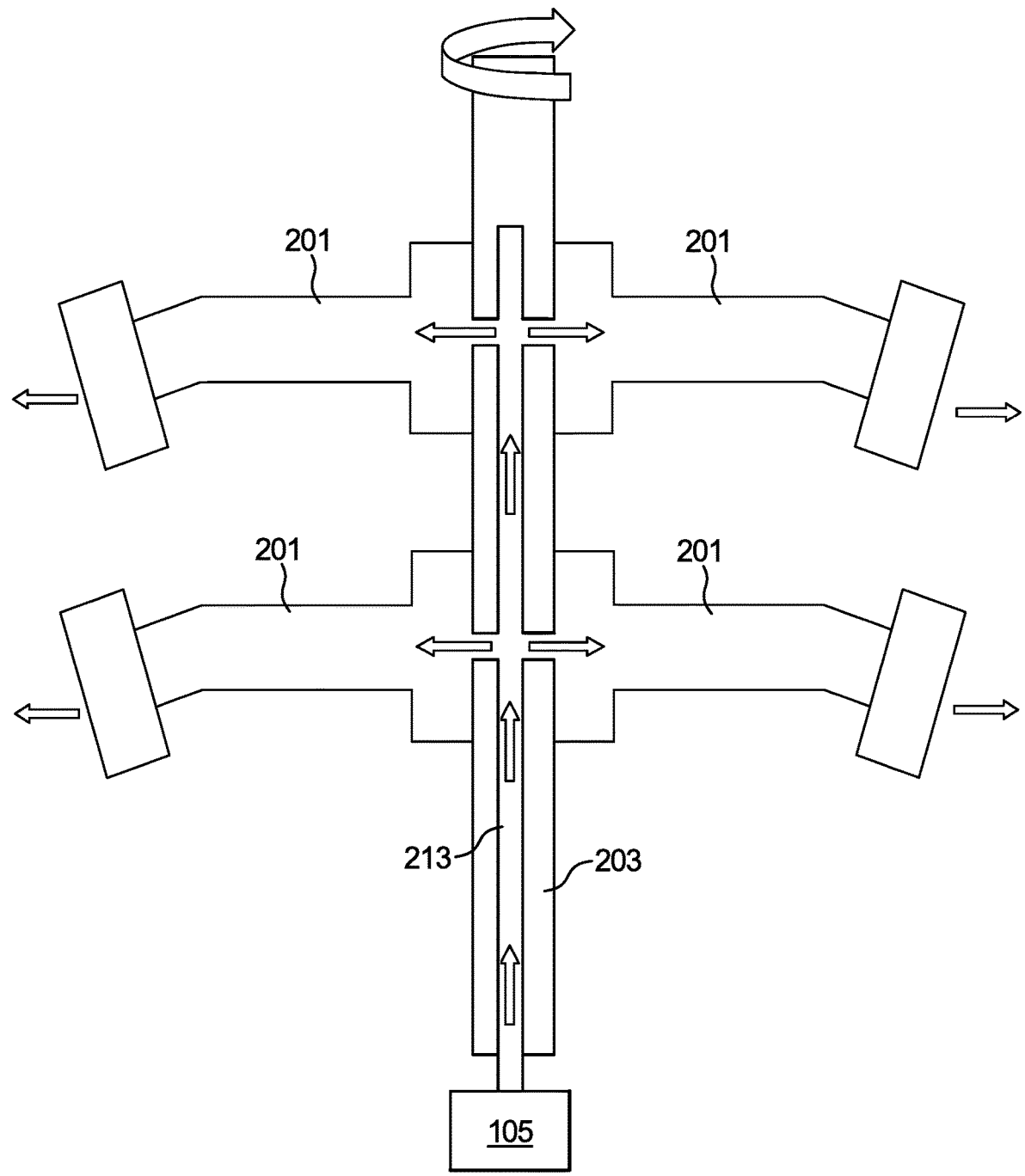
FIG. 2 is a schematic diagram of an embodiment of an assembly in accordance with this disclosure, showing a manifold having a plurality of additively manufactured parts disposed thereon and rotating about an axis of the manifold.
Figure 3:
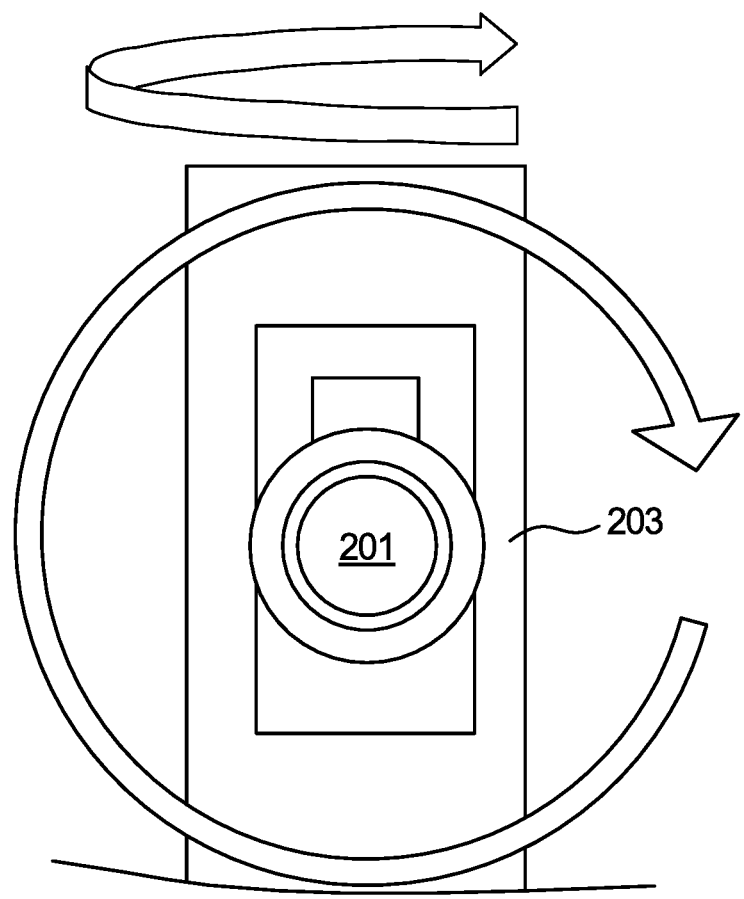
FIG. 3 is a schematic diagram of the embodiment of FIG. 2, further showing the AM part being spun around an axis of the AM part on the manifold such that the AM part is rotating about the axis of the manifold and about the axis of the AM part.
Figure 4:
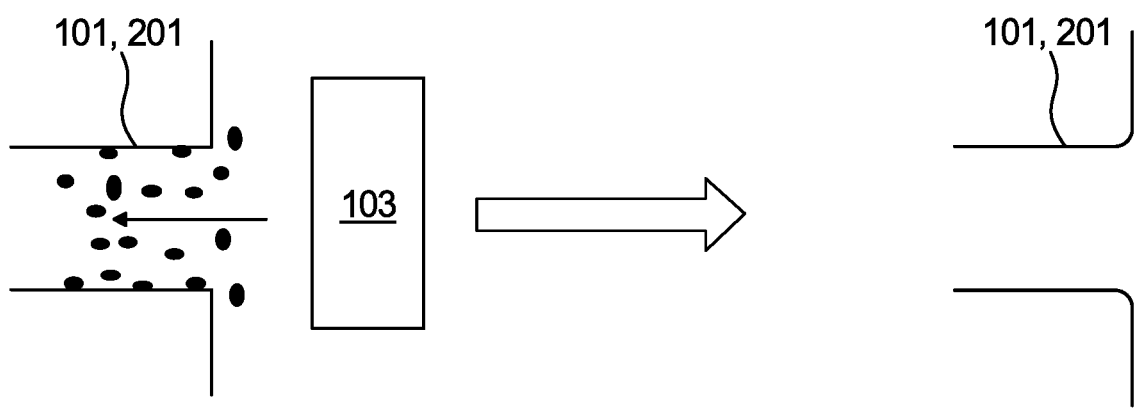
FIG. 4 shows a schematic of an embodiment of abrasive fluid media flowing through an AM part and the resulting polished surface of the AM part.

Reference will now be made to the drawings wherein like reference numerals identify similar structural features or aspects of the subject disclosure. For purposes of explanation and illustration, and not limitation, an illustrative view of an embodiment of an assembly and method in accordance with the disclosure is shown in FIG. 1 and is designated generally by reference character 100. Other embodiments and/or aspects of this disclosure are shown in FIGS. 2-4. The systems and methods described herein can be used to improve surface finish of additively manufactured parts, for example, or for any other suitable purpose.

In accordance with at least one aspect of this disclosure, an assembly for improving surface finish of an additively manufactured (AM) part can include a rotatable element configured to rotate at least one AM part while supplying an abrasive media that is caused to move relative to a surface (e.g., 106 in FIG. 1) of the at least one AM part due to centrifugal forces acting on the abrasive media while near the surface.

For example, in accordance with at least one aspect of this disclosure, referring to FIG. 1, an assembly 100 for improving surface finish of an additively manufactured (AM) part 101 can include a rotatable element 103 configured to rotate an AM part 101. The assembly 100 includes an abrasive media source 105 configured to be in fluid communication with the AM part 101 when disposed on the rotatable element 103 to allow abrasive media to be pulled through at least one internal channel 107 of the AM part 101 with rotation of the AM part 101 on the rotatable element 103.

In certain embodiments, the rotatable element 103 can be a spindle as shown in FIG. 1 for rotating a rotating component (e.g., a centrifugal compressor, an impeller) about a central axis thereof. The rotatable element 103 can include any suitable shape or size, or configured for use with any suitable part.

In certain embodiments, a conduit 109 can be configured to interface with the AM part 101. The conduit 109 can include a rotational seal 111 thereon configured to provide sealing with relative rotation between the AM part 101 and the conduit 109.

Referring to FIG. 2, in certain embodiments, the rotatable element 203 can be a manifold configured to receive an AM part 201 (e.g., a stationary part such as an AM fuel injector) such that the AM part 201 is in fluid communication with the abrasive media source 105. In certain embodiments, as shown, the manifold can be hollow (e.g., an define an internal channel 213) such that the manifold is configured to allow the abrasive media to be pulled through the manifold due to rotation of the manifold and the AM parts 201 thereon.

In certain embodiments, as shown in FIG. 3, one or more of the AM parts 201 can be rotatably attached to the rotatable element 203 such that the one or more of the AM parts 201 can rotate relative to the rotatable element 203 (e.g., around a central axis of the AM part 201) in addition to or independent of rotation of the rotatable element 203. The rotatable element 203 and/or one or more of the AM parts 201 can be attached to any suitable motor (e.g., mechanical, electrical) to rotate about its longitudinal axis, for example.

In accordance with at least one aspect of this disclosure, an embodiment of a method of altering an additively manufactured part can include causing an abrasive media to flow across a surface 106 of the additively manufactured part with centrifugal force and improving surface finish of the surface 106. The method can further include rotating the AM part about an axis that the AM part is configured to rotate during operation of the AM part.

Referring additionally to FIG. 4, in accordance with at least one aspect of this disclosure, an embodiment of a method for improving the surface finish (e.g., of a surface 106, which can be internal or external) of an additively manufactured article 101, 201 includes fluidly communicating at least one internal channel of an additively manufactured part 101, 201 to an abrasive fluid media source 103. The method can include rotating an additively manufactured (AM) part to induce abrasive fluid media to flow through the AM part 101, 201 to smooth a surface (e.g., an internal flow surface) of the AM part 101, 201.

In certain embodiments, the AM part 101, 201 can include a rotational component configured to rotate in use. For example, the AM part 101, 201 can be configured to generate flow in use (e.g., a centrifugal compressor, an impeller) through rotating around a central axis of the part 101, 201.

Rotating can include rotating the AM part 101, 201 about the central axis of the AM part 101, 201. Fluidly communicating the at least one internal channel of the AM part can include connecting the internal channel 107 of the AM part to a conduit 109 connected to the abrasive fluid media source 103. The method can include sealing the conduit 109 to the AM part with a rotational seal 111 configured to provide sealing with relative rotation between the AM part 101, 201 and the conduit 109.

In certain embodiments, fluidly communicating the at least one internal channel 107 can include disposing the AM part in a bath of the abrasive media (e.g., being placed within the source 105 such that the part is surrounded by abrasive media). Any other suitable fluid communication with an abrasive media source 103 is contemplated herein.

As shown in FIGS. 2 and 3, in certain embodiments, fluidly communicating the at least one internal channel includes disposing the AM part 203 on a rotatable element 203 (e.g., a manifold as shown) such that the at least one internal channel is in fluid communication with the abrasive media source 103. Rotating can include rotating the manifold about an axis thereof to rotate the AM part 203 around an axis of the manifold. In certain embodiments, rotating can also include rotating the AM part 203 about the central axis of the AM part 203 on the manifold.

In certain embodiments, a viscosity of the abrasive media can be about 100 centiPoise (cP) or below at room temperature. Any suitable viscosity and/or type of media is contemplated herein.

Any suitable type of AM parts can be used with assemblies as disclosed herein, e.g., rotating and non-rotating components. A rotating component can be spun in one direction, both directions, or alternating directions (i.e. agitation cycle in a washing machine). An example of a rotating component is an impeller. An impeller with an integral shroud is a non-limiting example of a rotating component. Shroudless impellers, for example, can be finished with appropriate tooling to promote flow of abrasive media in the correct direction and surface orientation.

In embodiments, one or more non-rotating components can be attached to a central manifold. The center manifold can be rotated while a low viscosity abrasive media is pulled (or partially pumped) through the channel. The centrifugal force draws the abrasive media through the component, allowing for a potentially higher viscosity abrasive media to be used.

In certain embodiments, the orientation and/or direction of rotation of the part can be flipped to repeat the process in the reverse orientation to ensure more uniform improvement in surface roughness. In certain embodiments, a low strength acid can be added to the solution to enhance the process for certain AM materials, removing additional material from the surface during the centrifugal surface finishing process. Changing the part orientation and/or the direction of part rotation can aid with improving the uniformity of material removal and with removing surface marks from the surface treatment using the original part orientation.

In accordance with at least one aspect of this disclosure, an embodiment of a method of altering an additively manufactured part can include orienting a surface of the additively manufactured part toward a rotational center that may be independent of a rotational axis defined by the additively manufactured part, flowing an abrasive media past the surface, rotating the additively manufacturing part about the rotational center; urging abrasive particles in the abrasive media past the surface abrasive media to impinge the surface with centrifugal force generated by the rotating, and improving surface finish of the surface.

For the abrasive fluid media, an embodiment for an upper limit of fluid viscosity may be up to about (e.g., ±20%) 100 centiPoise (cP) at room temperature. However, those skilled in the art recognize that any suitable viscosity is contemplated herein. Fluids or protective oils with a viscosity above 100 cP may be used. For example, viscosity drops with temperature, so embodiments can be performed at elevated temperature with a higher room temperature viscosity As shown in FIG. 4, some rounding of the orifice is still expected, but it will be less severe as the abrasive media will be able to pass through and work against the internal surfaces of the passageway having been drawn or pulled through by the centrifugal force rather than pushed or forced through. The viscosity can thus be lower than traditional honing media in certain embodiments. For example, commercially available, fine abrasive media can be used in a low viscosity oil or DI water. Viscosity can be selected to avoid a non-uniform material removal rate.

As described above, the centrifugal action of pulling abrasive media through a rotating component (e.g., an impeller) can create a statistically uniform surface finish. While rotating components are described herein, it is contemplated that any suitable part including non-rotating components can be used to improve the surface finish thereof. Accordingly, static parts can be subjected to any suitable embodiments and used with any suitable embodiments in accordance with this disclosure.

Performance testing can be integrated into embodiments to show when the internal surfaces of the component have been improved enough to meet or exceed the minimum performance characteristics. For example, once the performance characteristics have been met, the process can be terminated.

Embodiments can allow easier cleaning and removal abrasive media or abraded metal from the AM component versus extrude hone media which has the consistency of clay and is very difficult to remove from internal passages of an AM component.

Embodiments of the present disclosure, as described above and shown in the drawings, provide for improved additive manufacturing methods, systems, and apparatuses. While the apparatus and methods of the subject disclosure have been shown and described with reference to embodiments, those skilled in the art will readily appreciate that changes and/or modifications may be made thereto without departing from the spirit and scope of the subject disclosure.

What is claimed is:

1. A method for improving a surface finish of an additively manufactured part, comprising:
fluidly communicating at least one internal channel of an additively manufactured part to an abrasive fluid media source;
rotating the additively manufactured (AM) part to induce abrasive fluid media to flow through the AM part to smooth a surface of the AM part;
rotating the AM part about an axis that the AM part is configured to rotate during operation of the AM part, wherein the AM part is configured to generate flow in use through rotating around a central axis of the AM part, wherein rotating includes rotating the AM part about a central axis of the AM part, wherein fluidly communicating the at least one internal channel of the AM part includes connecting the internal channel of the AM part to a conduit connected to the abrasive fluid media source.

2. The method of claim 1, further comprising sealing the conduit to the AM part with a rotational seal configured to provide sealing with relative rotation between the AM part and the conduit.

3. The method of claim 1, wherein fluidly communicating the at least one internal channel includes disposing the AM part in a bath of the abrasive media.

4. The method of claim 1, wherein fluidly communicating the at least one internal channel includes disposing the AM part on a manifold such that the at least one internal channel is in fluid communication with the abrasive media source.

5. The method of claim 4, wherein rotating includes rotating the manifold about an axis thereof to rotate the AM part around an axis of the manifold.

6. The method of claim 5, wherein rotating includes rotating the AM part about the central axis of the AM part on the manifold.

7. The method of claim 1, wherein a viscosity of the abrasive media is about 100 centiPoise (cP) or below at room temperature.

8. An assembly for improving surface finish of an additively manufactured (AM) part, comprising:
a rotatable element configured to rotate at least one AM part while supplying an abrasive media that is caused to move relative to a surface of the at least one AM part due to centrifugal forces acting on the abrasive media while near the surface, wherein an abrasive media source is configured to be in fluid communication with the AM part when disposed on the rotatable element to allow abrasive media to be pulled through at least one internal channel of the AM part with rotation of the AM part on the rotatable element, wherein the rotatable element is a spindle for rotating the AM part about a central axis thereof, further comprising a conduit configured to interface with the AM part, wherein the conduit includes a rotational seal thereon configured to provide sealing with relative rotation between the AM part and the conduit.

9. The assembly of claim 8, wherein the rotatable element is a manifold configured to receive the AM part such that the AM part is in fluid communication with the abrasive media source.

10. The assembly of claim 9, wherein the manifold is hollow and configured to allow the abrasive media to be pulled through the manifold due to rotation of the manifold and the AM parts thereon.

11. An assembly for improving surface finish of an additively manufactured (AM) part, comprising:
a rotatable element configured to rotate at least one AM part while supplying an abrasive media that is caused to move relative to a surface of the at least one AM part due to centrifugal forces acting on the abrasive media while near the surface, wherein the rotatable element is a manifold configured to receive the AM part such that the AM part is in fluid communication with an abrasive media source, wherein the manifold is hollow and configured to allow the abrasive media to be pulled through the manifold due to rotation of the manifold and the AM parts thereon.

* * * * *